US011039241B2

(12) United States Patent
Rule et al.

(10) Patent No.: US 11,039,241 B2
(45) **Date of Patent: *Jun. 15, 2021**

(54) CONTROLLING AMBIENT SOUND VOLUME

(71) Applicant: Bose Corporation, Framingham, MA (US)

(72) Inventors: John Allen Rule, Berlin, MA (US); Daniel M. Gauger, Jr., Berlin, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,512

(22) Filed: Nov. 15, 2019

(65) Prior Publication Data

US 2020/0084536 A1 Mar. 12, 2020

Related U.S. Application Data

(63) Continuation of application No. 15/918,057, filed on Mar. 12, 2018, now Pat. No. 10,484,781, which is a (Continued)

(51) Int. Cl.
*H04B 15/00* (2006.01)
*H04R 1/10* (2006.01)
(Continued)

(52) U.S. Cl.
CPC ....... *H04R 1/1083* (2013.01); *G10K 11/1783* (2018.01); *G10K 11/17823* (2018.01);
(Continued)

(58) Field of Classification Search
CPC ...... H04R 1/1083; H04R 3/04; H04R 29/001; H04R 3/002; H04R 2410/05;
(Continued)

(56) References Cited

U.S. PATENT DOCUMENTS 8,594,353 B2 11/2013 Anderson
9,949,017 B2 * 4/2018 Rule ................ G10K 11/17854
(Continued)

FOREIGN PATENT DOCUMENTS

CN 101208742 A 6/2008
CN 105052170 A 11/2015
EP 2793224 A1 10/2014

OTHER PUBLICATIONS

First Chinese Office Action dated May 29, 2020 for Chinese Patent Application No. 201910900950.2.
(Continued)

*Primary Examiner* — Ammar T Hamid

(57) ABSTRACT

An earpiece includes a feed-forward microphone coupled to the environment outside the headphones, a feedback microphone coupled to an ear canal of a user when the earpiece is in use, a speaker coupled to the ear canal of the user when the earpiece is in use, a digital signal processor implementing feed-forward and feedback noise compensation filters between the respective microphones and the speaker, and a memory storing an ordered sequence of sets of filters for use by the digital signal processor. Each of the sets of filters includes a feed-forward filter that provides a different frequency-dependent amount of sound pass-through or cancellation, which in combination with residual ambient sound reaching the ear results in a total insertion gain at the ear of a user.

20 Claims, 3 Drawing Sheets

Related U.S. Application Data continuation of application No. 14/950,448, filed on Nov. 24, 2015, now Pat. No. 9,949,017.

(51) Int. Cl.

| | |
|---|---|
| ***G10K 11/178*** | (2006.01) |
| ***H04R 3/04*** | (2006.01) |
| ***H04R 29/00*** | (2006.01) |
| *H04R 3/00* | (2006.01) |

(52) U.S. Cl.

CPC .. *G10K 11/17837* (2018.01); *G10K 11/17853* (2018.01); *G10K 11/17854* (2018.01); *G10K 11/17861* (2018.01); *G10K 11/17881* (2018.01); *G10K 11/17885* (2018.01); *H04R 3/04* (2013.01); *H04R 29/001* (2013.01); *G10K 2210/1081* (2013.01); *G10K 2210/3026* (2013.01); *G10K 2210/3027* (2013.01); *G10K 2210/3028* (2013.01); *G10K 2210/511* (2013.01); *H04R 3/002* (2013.01); *H04R 2410/05* (2013.01); *H04R 2430/01* (2013.01); *H04R 2430/03* (2013.01); *H04R 2460/01* (2013.01); *H04R 2460/05* (2013.01)

(58) Field of Classification Search

CPC ............ H04R 2430/01; H04R 2430/03; H04R 2460/05; H04R 2460/01; G10K 11/17881; G10K 11/17854; G10K 11/178; G10K 2210/1081; G10K 2210/3026; G10K 2210/3027; G10K 2210/3028; G10K 2210/511; G10K 11/17861; G10K 11/17837; G10K 11/17823; G10K 11/17853; G10K 11/1783; G10K 11/17885

USPC .......................................................... 381/94.2

See application file for complete search history.

(56) References Cited

U.S. PATENT DOCUMENTS

| | | | | |
|---|---|---|---|---|
| 10,484,781 | B2 * | 11/2019 | Rule .................... | G10K 11/178 |
| 2014/0060289 | A1 | 3/2014 | Hirshberg | |
| 2014/0126734 | A1 * | 5/2014 | Gauger, Jr. ...... | G10K 11/17821<br>381/71.6 |

OTHER PUBLICATIONS

First Chinese Office Action dated Jun. 2, 2020 for Chinese Patent Application No. 201910903019.X.

* cited by examiner

CONTROLLING AMBIENT SOUND VOLUME

PRIORITY CLAIM

This application is a continuation of, and claims priority to, U.S. patent application Ser. No. 15/918,057, titled Controlling Ambient Sound Volume, filed Mar. 12, 2018, now U.S. Pat. No. 10,484,781, which is a continuation of, and claims priority to, U.S. patent application Ser. No. 14/950,448, titled Controlling Ambient Sound Volume, filed Nov. 24, 2015, now U.S. Pat. No. 9,949,017, the contents of which are hereby incorporated by reference.

BACKGROUND

This disclosure relates to controlling the volume of ambient sound heard through headphones.

U.S. Pat. No. 8,798,283, the contents of which are hereby incorporated by reference, describes using two sets of filters in a active noise-reducing (ANR) headphone to either cancel ambient noise, or to admit ambient noise with a filter applied that counters the passive effects of the headphone, such that the user hears the ambient noise as if not wearing the headphones. That application defines such a feature as "active hear-through" with "ambient naturalness."

SUMMARY

In general, in one aspect, an earpiece includes a feed-forward microphone coupled to the environment outside the headphones, a feedback microphone coupled to an ear canal of a user when the earpiece is in use, a speaker coupled to the ear canal of the user when the earpiece is in use, a digital signal processor implementing feed-forward and feedback noise compensation filters between the respective microphones and the speaker, and a memory storing an ordered sequence of sets of filters for use by the digital signal processor. Each of the sets of filters includes a feed-forward filter that provides a different frequency-dependent amount of sound pass-through or cancellation, which in combination with residual ambient sound reaching the ear results in a total insertion gain at the ear of a user. The overall sound level at the ear when using each of the sets of filters, for a given ambient sound level, differs from the overall sound level at the ear when using the adjacent set of filters in the sequence by no more than 5 dBA for a majority of changes between any two adjacent filter sets in the sequence.

Implementations may include one or more of the following, in any combination. The change in overall sound level at the ear when switching between adjacent filters in the sequence may be substantially constant over the whole sequence of filters. The change in overall sound level at the ear when switching between adjacent filters in the sequence may be a substantially smooth function over the whole sequence of filters. The function progresses from a smaller amount of change between filters providing less total noise reduction to a larger amount of change between filters providing more total noise reduction. The overall sound level at the ear when using each of the sets of filters, for a given ambient sound level, differs from the overall sound level at the ear when using the adjacent set of filters in the sequence by no more than 3 dBA for a majority of changes between any two adjacent filter sets in the sequence. The overall sound level at the ear when using each of the sets of filters, for a given ambient sound level, differs from the overall sound level at the ear when using the adjacent set of filters in the sequence by no more than 1 dBA for a majority of changes between any two adjacent filter sets in the sequence. The overall sound level at the ear when using each of the sets of filters, for a given ambient sound level, differs from the overall sound level at the ear when using the adjacent set of filters in the sequence by an amount that is not perceptible to a typical human. A user interface provides a two-directional control that when activated in the first direction or the second direction selects the corresponding next or previous filter to the present filter in the sequence. The user interface may include a pair of buttons, one of the buttons selecting the next filter in the sequence and the other button selecting the previous filter in the sequence. The user interface may include a continuous control, moving the control in a first direction selecting higher filters in the sequence, and moving the control in the second direction selecting lower filters in the sequence.

In general, in one aspect, an earpiece includes a feed-forward microphone coupled to the environment outside the headphones, a feedback microphone coupled to an ear canal of a user when the earpiece is in use, a speaker coupled to the ear canal of the user when the earpiece is in use, a digital signal processor implementing feed-forward and feedback noise compensation filters between the respective microphones and the speaker, and a memory storing an ordered sequence of sets of filters for use by the digital signal processor. Each of the sets of filters includes a feed-forward filter that provides a different frequency-dependent amount of sound pass-through or cancellation, at least some of the feed-forward filters cause ambient sound to be added to the sound output by the speaker at a first frequency range, and ambient sound to be cancelled by the sound output by the speaker in a second frequency range different from the first frequency range.

Implementations may include one or more of the following, in any combination. The first frequency range may correspond to a range where the feedback filters provide a high level of noise reduction. The first frequency range may correspond to a range where the earpiece provides a high level of passive noise reduction. The total overall sound at the ear of a user may be substantially constant in value, as measured on real heads, over at least at least 3 octaves of frequency, for at least a subset of the sets of filters. The three octaves may correspond to the voice-band. The sequence of filters may provide a total overall sound at the ear that preserves the voice-band while controlling levels outside of the voice-band. A first subset of the sets of filters may provide a total overall sound at the ear that preserves the voice-band while decreasing levels outside of the voice-band, and a second subset of the sets of filters may provide a total overall sound at the ear that is spectrally flat but reduces total sound level over a wide frequency band. At least two of the sets of filters may include feedback filters that each provide a different frequency-dependent amount of cancellation. An array of microphones external to the earpiece may be included, and at least two of the sets of filters may include microphone array filters that each provide a different frequency-dependent amount of audio from the microphone array to the speaker.

In general, in one aspect, operating an earpiece having a feed-forward microphone coupled to the environment outside the headphones, a feedback microphone coupled to an ear canal of a user when the earpiece may be in use, a speaker coupled to the ear canal of the user when the earpiece may be in use, a digital signal processor implementing feed-forward and feedback noise compensation filters between the respective microphones and the speaker, a memory storing an ordered sequence of sets of filters for use by the digital signal processor, and a user input providing two-directional input commands, includes, in response to receiving a command from the user input, loading a set of filters from the memory that includes a feed-forward filter that provides a different frequency-dependent amount of sound pass-through or cancellation, which in combination with residual ambient sound reaching the ear results in a total insertion gain at the ear of a user, the overall sound level at the ear when using the loaded set of filters, for a given ambient sound level, differs from the overall sound level at the ear when using the previously-loaded set of filters by no more than 5 dBA for a majority of changes between any two adjacent filter sets in the sequence.

Advantages include allowing the user to turn down the volume of ambient sound to their desired level, without cancelling it entirely.

All examples and features mentioned above can be combined in any technically possible way. Other features and advantages will be apparent from the description and the claims.

DESCRIPTION

By providing a large number of different filters for filtering ambient sound, a set of headphones can allow the user to hear the world around them at any volume level they choose, from barely loud enough to perceive, to the natural level they would experience without the headphones, or even to turn up the volume beyond the actual level present. Importantly, the spectral balance of the ambient sound is preserved, so that it sounds natural at every level. This effectively gives the headphone user a volume control on the world.

Figure 1:
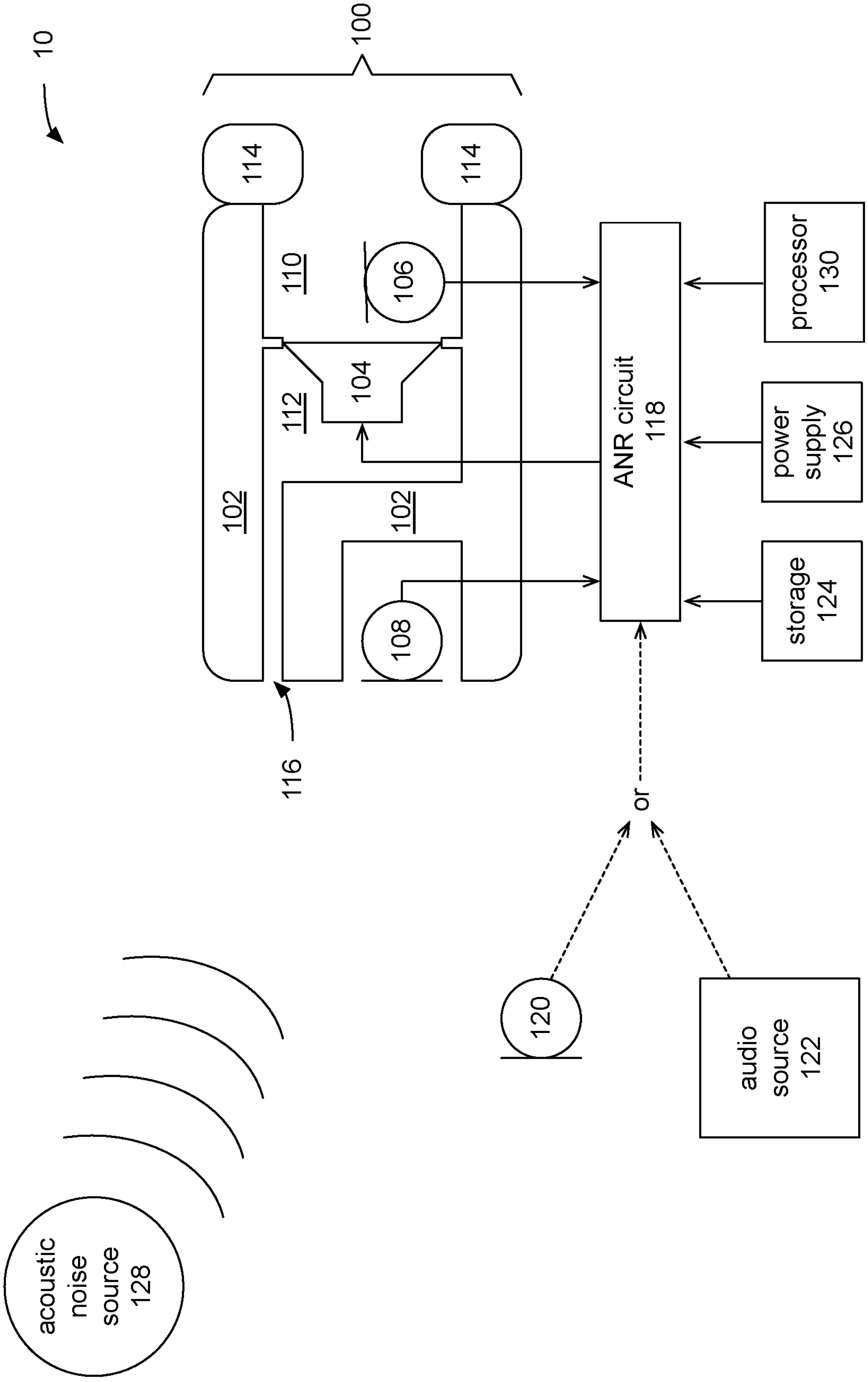
FIG. 1 shows a schematic diagram of an active noise reducing (ANR) headphone.

FIG. 1 shows a general block diagram of a headphone equipped to provide the features described below. A single earphone 100 is shown; most systems include a pair of earphones. An earpiece 102 includes an output transducer, or speaker 104, a feedback microphone 106, also referred to as the system microphone, and a feed-forward microphone 108. The speaker 102 divides the ear cup into a front volume 110 and a rear volume 112. The system microphone 106 is typically located in the front volume 110, which is coupled to the ear of the user by a cushion or ear tip 114. Aspects of the configuration of the front volume in an ANR headphone are described in U.S. Pat. No. 6,597,792, incorporated here by reference. In some examples, the rear volume 112 is coupled to the external environment by one or more ports 116, as described in U.S. Pat. No. 6,831,984, incorporated here by reference. The feed-forward microphone 108 is housed on the outside of the ear cup 102, and may be enclosed as described in U.S. Pat. No. 8,416,690, incorporated here by reference. In some examples, multiple feed-forward microphones are used, and their signals combined or used separately. References herein to the feed-forward microphone include designs with multiple feed-forward microphones. An in-ear implementation is described in U.S. Pat. No. 9,082,388, incorporated here by reference.

The microphones and speaker are all coupled to an ANR circuit 118. The ANR circuit may receive additional input from a communications microphone 120 or an audio source 122. In the case of a digital ANR circuit, for example that described in U.S. Pat. No. 8,073,150, incorporated here by reference, software or configuration parameters for the ANR circuit may be obtained from a storage 124, or they may be provided by an additional processor 130. The ANR system is powered by a power supply 126, which may be a battery, part of the audio source 122, or a communications system, for example. In some examples, one or more of the ANR circuit 118, storage 124, power source 126, communications microphone 120, and audio source 122 are located inside or attached to the earpiece 102, or divided between the two earpieces when two earphones 100 are provided. In some examples, some components, such as the ANR circuit, are duplicated between the earphones, while others, such as the power supply, are located in only one earphone, as described in U.S. Pat. No. 7,412,070, incorporated here by reference. The ambient noise to be controlled by the ANR headphone system is represented as acoustic noise source 128.

Figure 2A:
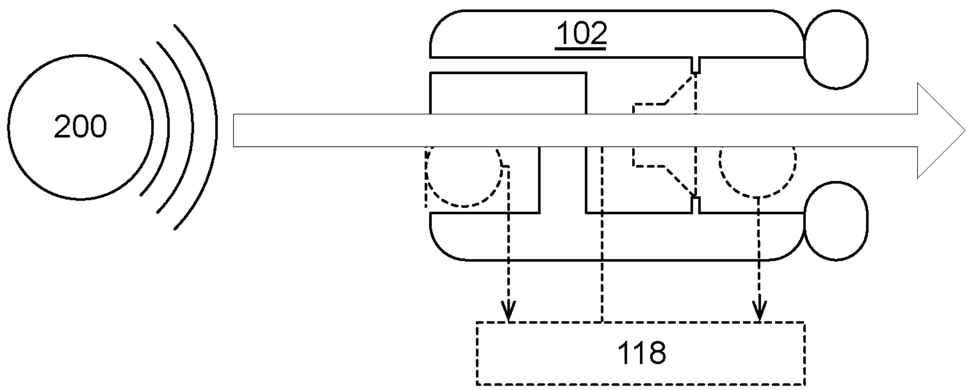
FIG. 2A through 2C show signal paths through an ANR headphone.
Figure 2B:
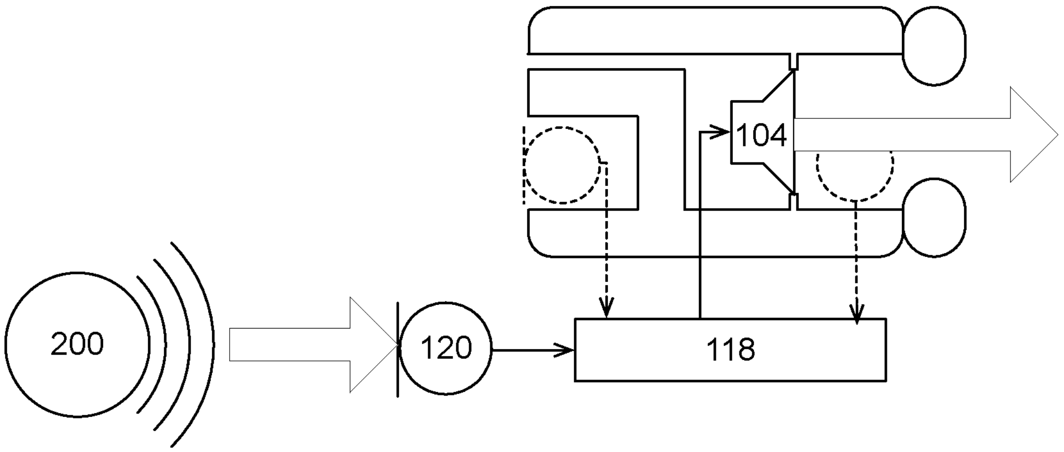
Figure 2C:
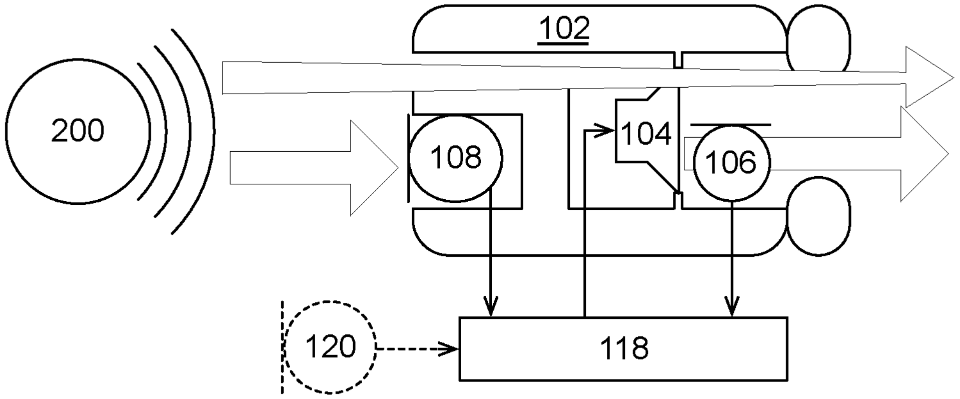

This application concerns improvements to hear-through achieved through sophisticated manipulation of the active noise reduction system, and in particular, providing the user with control over the volume level of the ambient sound while preserving its naturalness. Different hear-through topologies are illustrated in FIGS. 2A through 2C. In the simple version shown in FIG. 2A, the ANR circuit is turned off, allowing ambient sound 200 to pass through or around the ear cup, providing passive monitoring. This provides no ambient volume control, and the residual sound reaching the ear is unlikely to sound natural. In the version shown in FIG. 2B, a direct talk-through feature uses the communications microphone 120 to provide a talk-through microphone signal. This is coupled to the internal speaker 104 by the ANR circuit or some other circuit, to directly reproduce ambient sounds inside the ear cup. The feedback portion of the ANR system is left unmodified, treating the talk-through microphone signal as an ordinary audio signal to be reproduced, or turned off. The talk-through signal is generally band-limited to the voice band, and is generally only monaural, as only one communications microphone is normally used. Communications microphones also tend to be remote from the ear, i.e., at the mouth or along a cord, such that the sound picked up at the microphone does not sound the same as sound heard inside the ear. For these reasons, direct talk-through systems tend to sound artificial, as if the user is listening to the environment around him through a telephone. The volume level can be controlled, but the ambient sound does not sound natural. In some examples, the feed-forward microphone serves double duty as the talk-through microphone, with the sound it detects reproduced rather than cancelled. If the feed-forward microphone on both left and right earpieces is passed, some spatial hearing is provided but simply reproducing the sound from the feed-forward microphone in the earpiece does not take into account the interaction of that signal with the passive transmission of ambient sound through the earpiece, so they do not combine to provide a natural-sounding experience.

We define active hear-through to describe a feature that varies the active noise cancellation parameters of a headset so that the user can hear some or all of the ambient sounds in the environment. We further define ambient naturalness to mean that the active hear-through sounds natural, as if the headset were not present (but for volume changes). The goal of active hear-through is to let the user hear the environment as if they were not wearing the headset at all, and further, to control its volume level. That is, while direct talk-through as in FIG. 2B tends to sound artificial, and passive monitoring as in FIG. 2A leaves the ambient sounds muddled by the passive attenuation of the headset, active hear-through strives to make the ambient sounds sound completely natural.

Active hear-through (HT) is provided, as shown in FIG. 2C, by using one or more feed-forward microphones 108 (only one shown) to detect the ambient sound, and adjusting the ANR filters for at least the feed-forward noise cancellation loop to allow a controlled amount of the ambient sound 200 to pass through the ear cup 102 with different cancellation than would otherwise be applied, i.e., in normal noise cancelling (NC) operation. Depending on the volume level selected, the filters may result in a net adding of noise in some frequency ranges and a net decreasing of noise in others. Providing a number of different filters allows the headphone to control the level of ambient sound that is passed, while preserving its naturalness. The filters are arranged in a sequence that is presented to the user in a familiar form, such that the user can move through the sequence linearly, e.g., with a knob, slider, or up/down buttons. The user does not need to be concerned with the particulars of the filters, such as which ones are adding sound and which are decreasing it. Rather, the user simply chooses to hear "more" or "less" of the world.

Providing ambient volume control that is pleasing to the user requires the set of filters to have several particular features. First, there is the number of filter sets. The '283 patent suggested three, one for ANR, one for hear-through, and one to manage the user's own voice. The Quiet Comfort® 20 Noise Canceling Headphone® from Bose Corporation provides two filter sets. Other commercial products have provided four filter sets. We have found that to provide intuitive control, that the user will understand as "volume control" for the ambient sound, a larger number of filter sets are needed. Ideally, a continuous scale would be provided, but given practical considerations of memory size and processing power, some finite number of steps will be used. Ultimately, the number of steps will be a function of the total range of noise reduction provided, and the step size.

The feed-forward filters and their effects can be characterized in several ways. Each filter has a response on its own, which produces an amount of attenuation in the feed-forward path. The combination of that attenuation and the other effects of the headphone—feedback, if any, and the passive effects of the headphone, result in a total insertion gain at the ear. As it is the insertion gain that is directly experienced by the user, that is what we will refer to in characterizing the filters. The step size corresponds to the amount of difference between the insertion gains resulting from adjacent filter sets (i.e., the insertion gain resulting from feed-forward filters provided at two adjacent increments up and down an ambient volume control scale). An upper limit on the step size should be selected such that the change in level between steps is perceived as a smooth transition. Providing an average change in total sound level at the ear for typical ambient noise of around 3 dBA between adjacent filter sets may be a good starting point, as it matches the difference between overall sound pressure levels that people can typically perceive. Larger steps, such as 4 or 5 dBA, may be used, if the perceived difference between the steps is small enough. In particular, when discrete "up/down" buttons are used, larger steps may be desired so that the user is confident a change was made, i.e., they can definitely hear the difference. In other examples, smaller steps may be used, to provide an even smoother transition, such as when a continuous control is used. It may also be desirable for the steps size to vary with position in the sequence, with progressively smaller steps between louder levels, where differences are more noticeable. See, for example, FIG. 3, which shows twelve target insertion gain curves 302*a*-302*l* between maximum ANR (bottom curve 302*a*) and maximum world volume (top curve 302*l*). The curves corresponding to higher volumes are closer together, with the exception of the hump around 1 kHz where the high-noise-reduction curves are constrained by the performance of the device.

Figure 3:
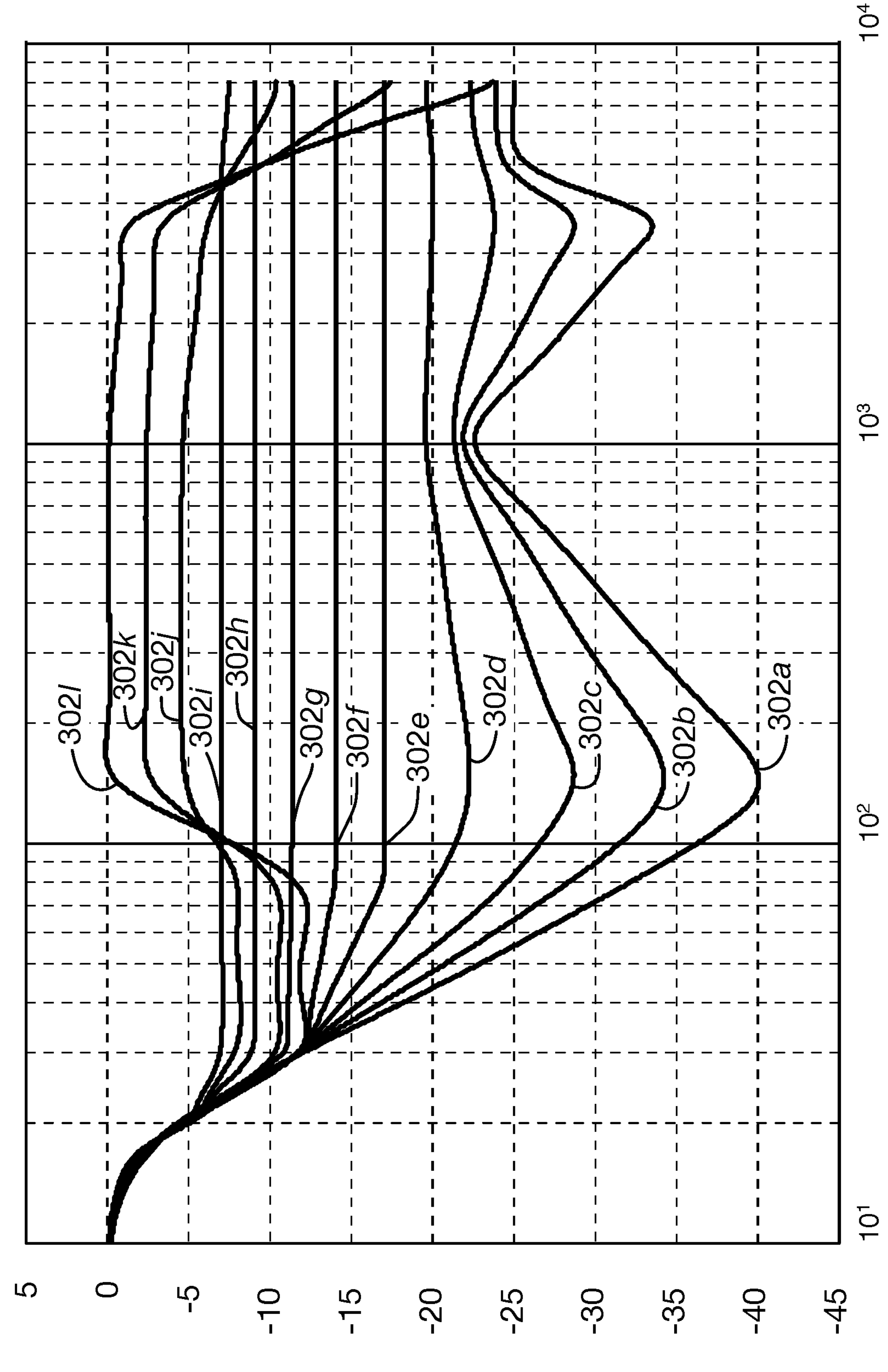
FIG. 3 shows a graph of insertion gain target curves.

Another attribute of the filters that provides natural sounding ambient sound at all volume levels, also seen in FIG. 3, is that the insertion gains are not flat over the range of frequencies reproduced by the headphones, and are not the same from filter to filter. In particular, the feed-forward filters are designed to add environmental sound over what is passed passively by the headphones at higher frequencies, and over lower frequencies that are not cancelled by the feedback system, but to cancel sound at the crossover region between where feedback and passive attenuation are each dominant in the total response.

In addition to controlling the volume of the outside world without distorting its spectral properties, these filter sets can also be used to deliver custom ambient sounds which enhance hearing in some way. In one example, a speech-band limited active hear-through provides natural speech at a number of different attenuation levels. This is different than a wide-band filter designed to pass all audio at an attenuated level. Instead of being shaped to pass audio at all frequencies, the sequence of filters provides substantially the same response over at least 3 octaves (i.e., around typical voice band, 300 Hz to 3 kHz), but changing in noise reduction at lower and higher frequencies. In another example, a sequence has at least two different noise reduction responses where the sequence smoothly morphs from one to the other over a number of steps. In yet another example, a voice-oriented target at maximum world volume morphs into a wideband flat response with some attenuation for listing to the environment. This can be particularly useful at a concert, where the maximum setting removes the background noise so that people can talk with each other, but the intermediate setting lets them enjoy the music at a reduced volume. This is the effect of the set of curves shown in FIG. 3. The actual $K_{ht}$ filters to be used to provide a total insertion gain matching these curves is found as described in the '283 patent, with the curves serving as the targets for the optimizer, $T_{htig}$, rather than using $T_{htig}=0$ as suggested in that patent.

The above discussion of controlling only the feed-forward filters should not be taken to suggest that all the work is done by the those filters. In some examples, the feedback attenuation at low frequencies can be reduced, which lets in more ambient sound, to the point where no feed-forward noise reduction is required at low frequencies. Each sensor path provides another degree of freedom, such that feedback can be used to achieve one objective (e.g., flatten the user's own self-voice, for example, which also cancels a certain amount of external noise), feed-forward/hear-through to achieve some ambient target at the user's ear, and a directional microphone array to amplify the voice of a person sitting across from the user.

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus for controlling ambient sound volume comprising:

an earpiece having a feed-forward microphone coupled to the environment outside the earpiece, a speaker coupled to the ear canal of the user when the earpiece is in use, and a processor implementing feed-forward noise compensation filters between the feed-forward microphone and the speaker, wherein:

the processor is configured to implement multiple sets of feed-forward filters, wherein each of the sets of feed-forward filters provides a different frequency-dependent amount of sound pass-through or cancellation, which in combination with residual ambient sound reaching an ear results in a total insertion gain at the ear of a user, and at least a subset of the sets of filters provide the same response over at least 3 octaves in the human voice band, and add ambient sound at different levels outside of the human voice band when compared to the insertion gain achieved in a full active noise reduction (ANR) mode.

2. The apparatus of claim 1, wherein an overall sound level at the ear when using each of the sets of feed-forward filters, for a given ambient sound level, differs from the overall sound level at the ear when using an adjacent set of feed-forward filters by no more than 5 dBA for a majority of changes between any two adjacent sets of feed-forward filters.

3. The apparatus of claim 1, wherein the overall sound level at the ear when using each of the sets of feed-forward filters, for a given ambient sound level, differs from the overall sound level at the ear when using an adjacent set of feed-forward filters by an amount that is not perceptible to a typical human.

4. The apparatus of claim 1, further comprising a user interface, wherein the user interface provides a two-directional control that when activated in the first direction or the second direction selects a different set of feed-forward filters from the present set of feed-forward filters.

5. The apparatus of claim 1, wherein each of the sets of feed-forward filters results in a different total insertion gain at the ear in the human voice band.

6. The apparatus of claim 1, further comprising a feedback microphone coupled to an ear canal of a user when the earpiece is in use, and wherein the processor is further configured to implement feedback noise compensation filters between the feedback microphone and the speaker.

7. The apparatus of claim 1, wherein at least some of the sets of feed-forward filters cause ambient sound to be added to sound output by the speaker at frequencies above a high frequency threshold and at frequencies below a low frequency threshold, and cause ambient sound to be cancelled by the sound output by the speaker at a crossover region.

8. The apparatus of claim 1, wherein at least some of the sets of feed-forward filters provide substantially the same response over at least 3 octaves in the human voice band, with each of the sets of feed-forward filters providing a different overall level of sound at the ear.

9. The apparatus of claim 1, wherein each of the sets of feed-forward filters provides different levels of noise reduction at frequencies outside the human voice band.

10. The apparatus of claim 1, wherein at least some of the sets of feed-forward filters provide substantially the same response over at least 3 octaves in the human voice band, and add ambient sound at different levels in a first frequency range within the human voice band, while cancelling ambient sound at different levels in a second frequency range within the human voice band.

11. A method of operating an earpiece having a feed-forward microphone coupled to the environment outside the earpiece, a speaker coupled to the ear canal of the user when the earpiece is in use, a processor implementing feed-forward noise compensation filters between the feed-forward microphone and the speaker, the method comprising:

operating the processor to implement a set of feed-forward filters that provides a different frequency-dependent amount of sound pass-through or cancellation, which in combination with residual ambient sound reaching an ear results in a total insertion gain at the ear of a user, and at least a subset of the sets of filters provide the same response over at least 3 octaves in the human voice band, and add ambient sound at different levels outside of the human voice band when compared to the insertion gain achieved in a full active noise reduction (ANR) mode.

12. The method of claim 11, wherein an overall sound level at the ear when using each of the sets of feed-forward filters, for a given ambient sound level, differs from the overall sound level at the ear when using an adjacent set of feed-forward filters by no more than 5 dBA for a majority of changes between any two adjacent sets of feed-forward filters.

13. The method of claim 11, wherein the overall sound level at the ear when using each of the sets of feed-forward filters, for a given ambient sound level, differs from the overall sound level at the ear when using an adjacent set of feed-forward filters by an amount that is not perceptible to a typical human.

14. The method of claim 11, wherein the earpiece further comprises a user interface, wherein the user interface provides a two-directional control that when activated in the first direction or the second direction selects a different set of feed-forward filters from the present set of feed-forward filters.

15. The method of claim 11, wherein each of the sets of feed-forward filters results in a different total insertion gain at the ear in the human voice band.

16. The method of claim 11, wherein the earpiece further comprises a feedback microphone coupled to an ear canal of a user when the earpiece is in use, and wherein the processor is further configured to implement feedback noise compensation filters between the feedback microphone and the speaker.

17. The method of claim 11, wherein at least some of the sets of feed-forward filters cause ambient sound to be added to sound output by the speaker at frequencies above a high frequency threshold and at frequencies below a low frequency threshold, and cause ambient sound to be cancelled by the sound output by the speaker at a crossover region.

18. The apparatus of claim 11, wherein at least some of the sets of feed-forward filters provide substantially the same response over at least 3 octaves in the human voice band, with each of the sets of feed-forward filters providing a different overall level of sound at the ear.

19. The apparatus of claim 11, wherein each of the sets of feed-forward filters provides different levels of noise reduction at frequencies outside the human voice band.

20. The apparatus of claim 11, wherein at least some of the sets of feed-forward filters provide substantially the same response over at least 3 octaves in the human voice band, and add ambient sound at different levels in a first frequency range within the human voice band, while cancelling ambient sound at different levels in a second frequency range within the human voice band.

* * * * *